United States Patent [19]

Hagihara

[11] Patent Number: 5,231,415
[45] Date of Patent: Jul. 27, 1993

[54] BOOTH'S MULTIPLYING CIRCUIT

[75] Inventor: Yasuhiko Hagihara, Tokyo, Japan

[73] Assignee: NEC Corporation, Tokyo, Japan

[21] Appl. No.: 3,556

[22] Filed: Jan. 13, 1993

[30] Foreign Application Priority Data

Jan. 13, 1992 [JP] Japan .................................. 4-3441

[51] Int. Cl.[5] .............................................. G06F 7/52
[52] U.S. Cl. .................................................. 364/760
[58] Field of Search ................. 364/754, 757, 759, 760

[56] References Cited

U.S. PATENT DOCUMENTS

| | | | |
|---|---|---|---|
| 4,745,570 | 5/1988 | Diedrich et al. ..................... | 364/760 |
| 4,748,584 | 5/1988 | Noda .................................... | 364/760 |
| 4,799,183 | 1/1989 | Nakano et al. ...................... | 364/760 |
| 4,807,175 | 2/1989 | Tokumaru et al. .................. | 364/760 |
| 4,813,008 | 3/1989 | Shigehara et al. ................... | 364/760 |
| 4,825,401 | 4/1989 | Ikumi .................................... | 364/760 |
| 4,910,701 | 3/1990 | Gibbons et al. ..................... | 364/760 |

Primary Examiner—Tan V. Mai

[57] ABSTRACT

A multiplying circuit is able to perform a multiplication of n bits×n bits at a high speed by increasing the speed of the forming process of the partial products so that the delay time may be inhibited from increasing for a large n, and which can inhibit the chip size from becoming large. A 6-bit multiplier (Y1 to Y6) is divided into bit sets each having plural bits. The thus divided sets are inputted respectively into booth decoders 1A to 1C to generate three-bit interim outputs m1 to m3. On the other hand, partial product generating circuits 2A, 2B and 2C receive a multiplicand X of plural bits to form partial products p1, p2 and p3 respectively by multiplying the multiplicand X with the interim outputs m1, m2 and m3. These partial products p1 to p3 are transformed in a first full adder allay 3 into interim sums r1 and r2. The thus formed interim sums r1 and r2 are added in a second full adder allay 4 with a value. "s" which is prepared by arranging the lowest bits of the interim outputs m1, m2 and m3 by every other bits with "0" therebetween. The thus formed interim sums are defined as r3 and r4. An adder 5 adds up these interim sums r3 and r4 to provide a multiplication output.

4 Claims, 3 Drawing Sheets

BOOTH'S MULTIPLYING CIRCUIT

BACKGROUND OF THE INVENTION

1. Field of the Invention

The present invention relates to a multiplying circuit, and more particularly, to a binary multiplier formed of an integrated circuit.

2. Description of the Related Art

In a conventional binary multiplier, or n bits×n bits multiplying circuit formed using an integrated circuit, a multiplication operation is carried out such that, all bits of a multiplicand are multiplied one by one by each single bit of the multiplier to make logical products so as to form n-sets of n-bit partial products, and the thus obtained partial products are summed up using full adders. Such a multiplying circuit is called "array type multiplier".

FIG. 1 is a block diagram showing one example of a conventional multiplying circuit. The conventional multiplying circuit shown in FIG. 1, is an array type multiplier of 4 bits×4 bits, including sixteen AND gates A1 to A16, and four full adder series FA1 to FA4; FA5 to FA8; FA9 to FA12; and FA13 to FA16. First of all, multiplication of each bit of multiplicand X1 to X4 and each bit of multiplier Y1 to Y4 is executed in a corresponding AND gate of A1 to A16, to make a respective logical product The outputs of the AND gates A1 to A4 for forming a first set of logical products are input into respective first full adders FA1 to FA4. Despite that the first full adders FA1 to FA4 do not make any actual adding operation, they are provided so that the regularity of the layout for interconnecting will not be lost. These outputs of the first full adders FA1 to FA4 are added in second full adders FA5 to FA8 to the respective outputs of the AND gates A5 to A8 for forming second set of logical products. Then, the outputs of the second full adders FA5 to FA8 are added in third full adders FA9 to FA12 to the respective outputs of the AND gates A9 to A12 for forming a third set of logical products. Finally, the outputs of the third full adders FA9 to FA12 are added in fourth full adders FA13 to FA16 to the respective outputs of the AND gates A13 to A16 for forming a fourth set of logical products, whereby multiplication result P1 to P8 can be obtained. Here, the lowest three bits P1 to P3 in the multiplication result are outputted directly from the first to third full adder series, respectively.

The maximum delay path of the multiplying circuit is composed of one step for all the AND gates and seven steps for full adders. When a larger multiplying device of n bits×n bits is constructed applying the above multiplying circuit structure, the maximum delay path includes one step for all AND gate and (2n−1) steps for full adders, or is approximately proportional to n.

Since the above-stated conventional array type multiplying circuit is composed of simple macro-cells arranged regularly, it is easy to design but has a drawback that the operation speed is low. The delay time for this multiplying circuit is proportional to n or the bit number of the multiplicand and multiplier. so that the circumstance becomes more unfavorable particularly when the circuit is required to be large-sized. On the other hand, since the total number of AND gates and full adders in the multiplying device of n bits×n bits is in proportion with square of n, this disadvantageously increases the chip in size.

SUMMARY OF THE INVENTION

It is therefore an object of the present invention to provide a multiplying circuit for executing a multiplication of n bits×n bits which can inhibit the delay time from becoming longer even for a large n by performing the formation of partial products at a high speed, and which also makes it possible to reduce the area of the chip used.

A multiplying circuit in accordance with the present invention comprises: a plurality of booth decoders each receiving a group of bits into which a multiplier is divided, and outputting corresponding interim result; a plurality of partial product generating circuits each connected at the input side thereof to respective aforesaid booth decoders, and receiving a multiplicand of plural bits to generate a partial product of the multiplicand with the interim result; a first full adder array for forming first interim sums by adding up the partial products from the plural partial product generating circuits; a second full adder array for forming second interim sums by adding up the first interim sums and a value which is formed by arranging each of the lowest bits of the plural interim results spaced apart by an interval of plural bits; and an adder for adding up the second interim sums provided by the second full adder array to generate a multiplication output.

The maximum delay time in the tree type binary multiplying circuit of the present invention is determined by a sum of a time in which partial products are formed from the outputs of booth decoders having a multiplier provided and a multiplicand, and a time in which the thus formed partial products are added up. Of these, in the present invention, the speed of the process for forming partial products is improved. More specifically, in a booth decoder shown in FIG. 3, the fan out of BO0 is about two times as much as those of the BO1 and BO2. To compensate for this, the booth decoder is designed such that the path from the input port to the output port for BO0 includes less gate steps than those for the other outputs. In addition, a block partial product generating circuit section in the partial product generating circuit as shown in FIG. 4 is designed such that the delay time from the input port for BO0 to the output port OUT is made less than that of the other path from its input port to the output port. As a result, even if the signal BO0 reaches the partial product generating circuit later than the other input signals, the delay would not exert upon the total speed. In addition, the partial product generating circuit can be formed by repetitions of a simple structure, thus the design itself can be simplified. That is, by combining the booth decoders with the partial product generating circuits, partial products of (m+1) bits should be generated from an m-bit multiplicand. This can be handled by providing (m+1) sets of block partial product generating sections for the partial product generating circuit. In this case, an input signal X2 of the lowest partial generating section is substituted with a theoretical value "0", whereas both the input signals X1 and X2 of the highest partial generating section are provided with the highest bit of the multiplicand. With these measures, the entire chip area can be kept small.

DETAILED DESCRIPTION OF PREFERRED EMBODIMENT

The present invention will be explained hereinafter with reference to the drawings.

Figure 1:
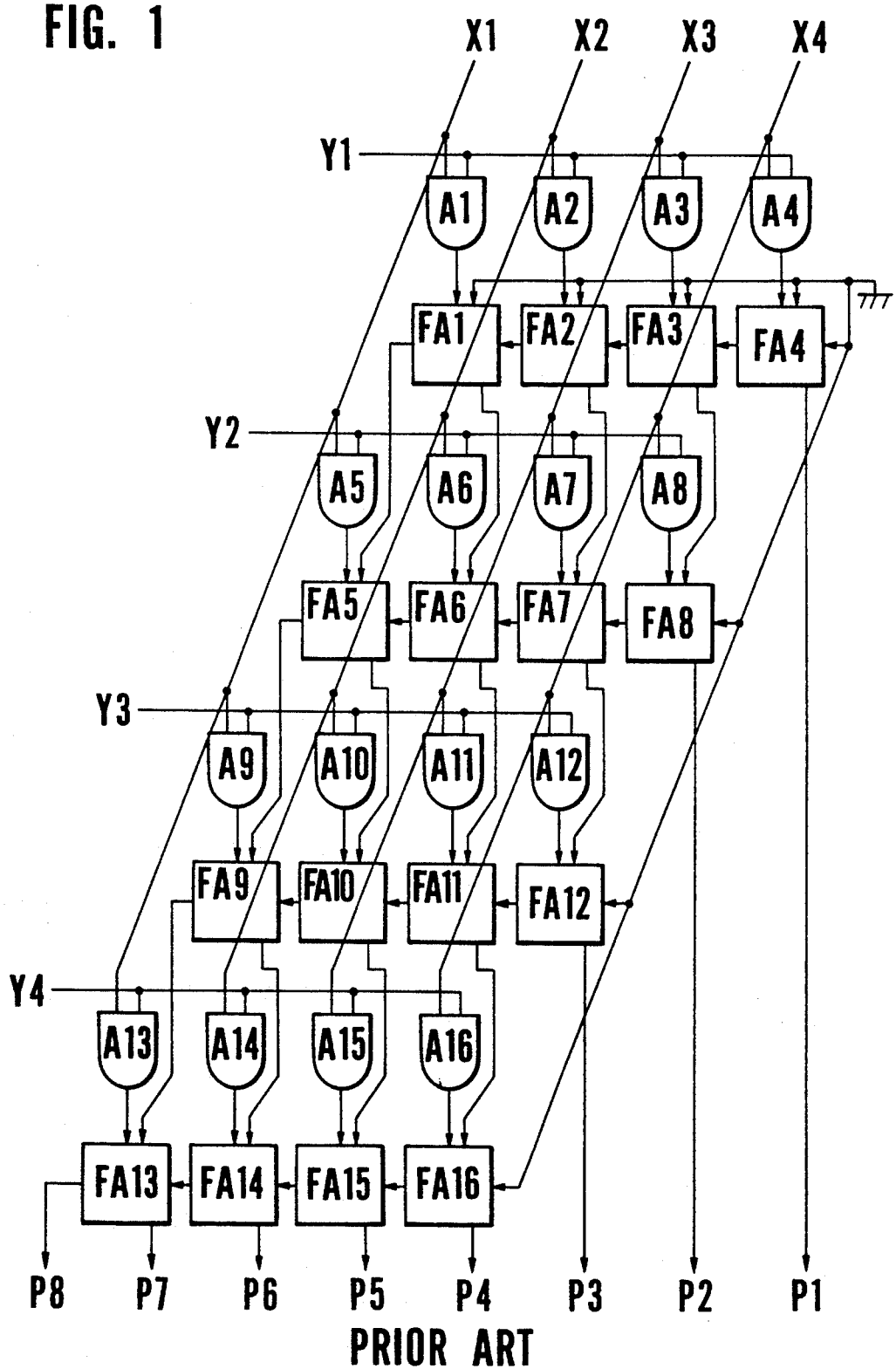
FIG. 1 is a block diagram showing one example of a conventional multiplying circuit.
Figure 2:
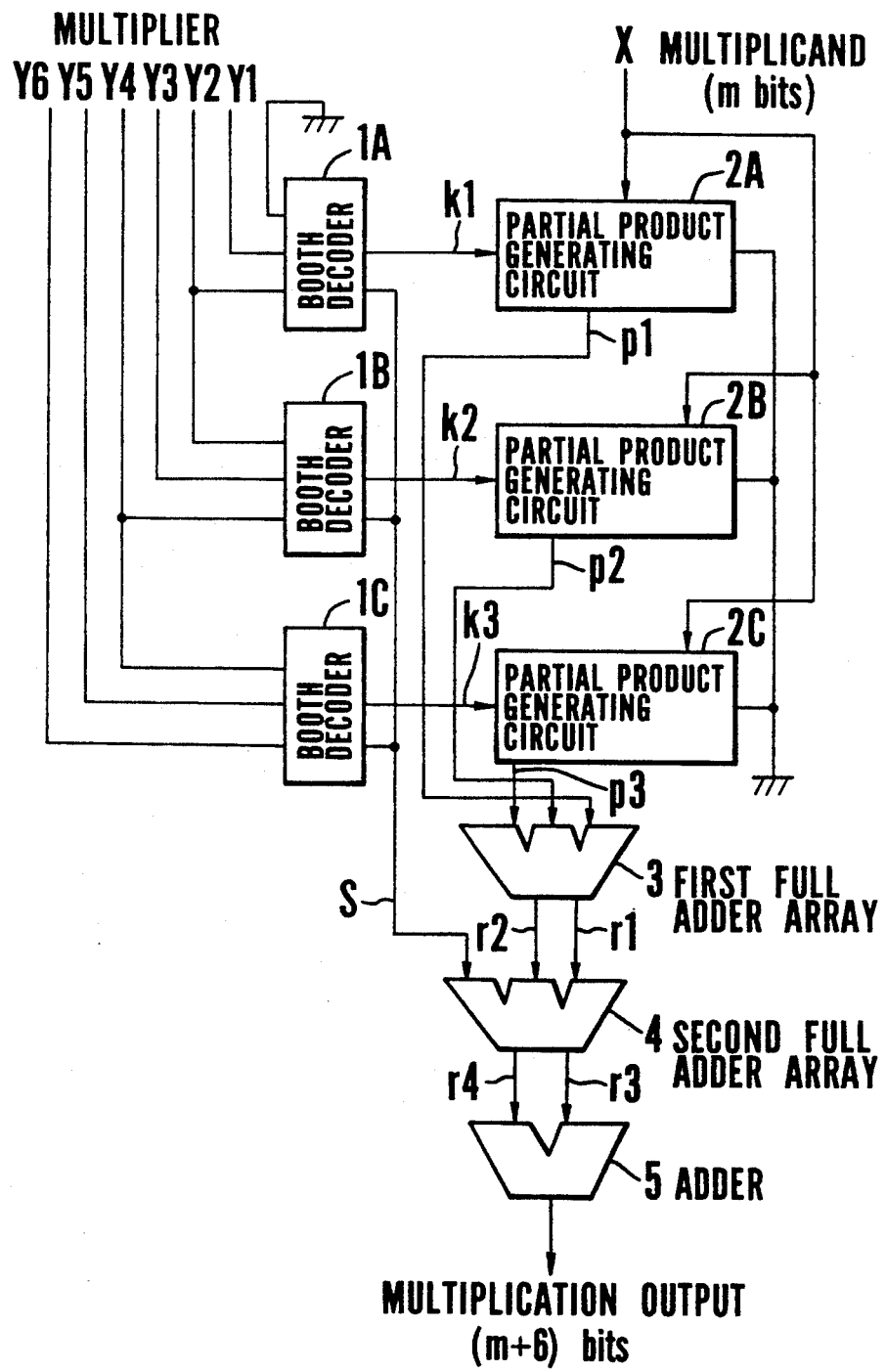
FIG. 2 is a block diagram showing one embodiment of a multiplying circuit according to the present invention.

FIG. 2 is a block diagram showing one embodiment of a multiplying circuit according to the present invention. As shown in FIG. 2, a multiplier of this embodiment is composed of 6 bits×m bits, comprising three booth decoders 1A to 1C, three partial product generating circuits 2A to 2C, two sets of full adder array 3 and 4, and an adder 5 so as to perform an multiplication of a multiplicand X of m bit by a multiplier of six bits each composed of Y1 to Y6. First of all, the booth decoders 1A to 1C each receive a respective group of two bits into which the multiplier is divided, and respectively generate first to third interim outputs k1 to k3 each composed of three bits. Three partial product generating circuits 2A to 2C each include (m+1) sets of block partial product generating sections, and each receive the multiplicand X of m bits and respective interim outputs k1 to k3. Accordingly, each of the circuits 2A to 2C multiplies the multiplicand X by the respective interim output k1, k2 or k3 to generate a corresponding partial product p1, p2 or p3 composed of (m+1) bits. These partial products p1 to p3 are added up in a first full adder array 3 and are transformed into first interim sums r1 and r2. Meanwhile, a signal in FIG. 2 comprises six bits and is constructed as follows. That is, the signal s includes three two-bit signals s1, s2 and s3 as its lower, middle and upper parts, respectively. The lower bits of the two-bit signals s1, s2 and s3 are allotted with the respective lowest bits of k1, k2 and k3 outputted from the booth decoders 1A, 1B and 1C. On the other hand, the upper bits of the signals s1 to s3 are all allotted with "0". The thus constructed signal is added up together with the first interim sums r1 and r2 in the second full adder array 4 to be transformed into second interim sums r3 and r4. The obtained second interim sums r3 and r4 transformed in the second full adder array 4 are finally added up in the adder 5 to provide an multiplication output of (m+6) bits.

Figure 3:
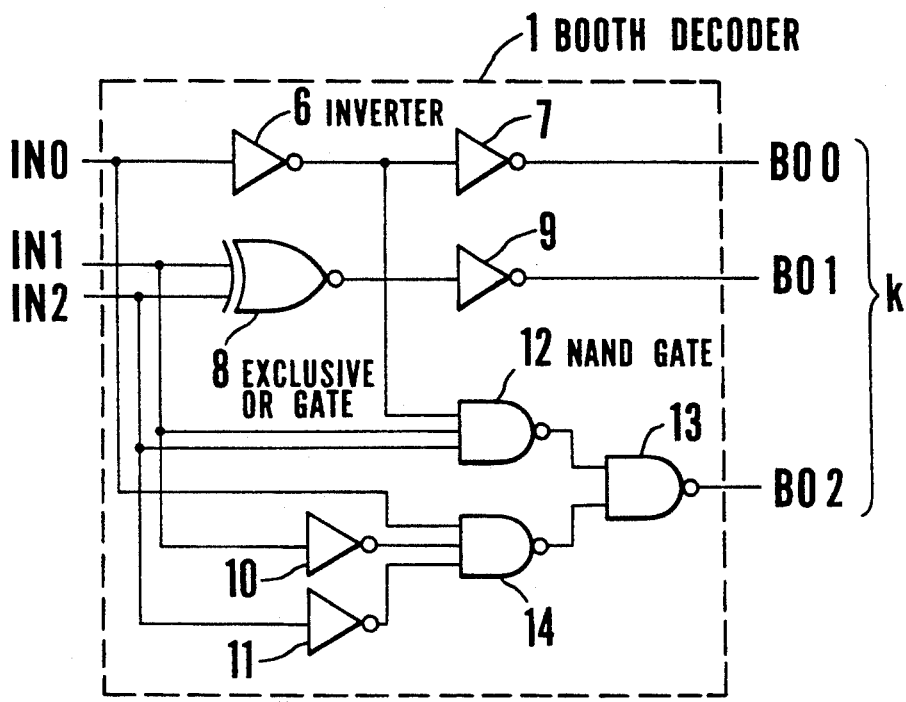
FIG. 3 is a detailed circuit of a booth decoder shown in FIG. 2.

FIG. 3 is a detailed circuit of a booth decoder shown in FIG. 2.

As shown in FIG. 3, the booth decoder 1 receives input signals IN0 to IN3 to which the grouped bits of the multiplier have been allotted, and develops them to output interim signals BO0 to BO3. For this purpose the booth decoder 1 comprises five inverters 6, 7 and 9 to 11, an exclusive OR gate 8, and three NAND gates 12 to 14. A series of the first and second inverters 6 and 7 is connected between a first input port for receiving the signal IN0 and a first output port for outputting BO0. The exclusive OR gate 8 is provided with the second input signal IN1 and the third input signal IN2 for the multiplier. The third inverter 9 is disposed between an output port of the exclusive OR gate 8 and a second output port for outputting BO1. The fourth and fifth inverters 10, 11 are respectively provided with the second input signal IN1 and the third input signal IN2 similarly to the exclusive OR gate 8. The first NAND gate 12 receives an output signal from the first inverter 6, and the second and third input signals IN1 and IN2. The second NAND gate 14 receives the first input signal IN0 and the output signals from the fourth and fifth inverters 10, 11. The third NAND gate 13 is inputted with the outputs from the first and second NAND gates to generate the third output signal BO2.

The input signal IN1 into a booth decoder 1 is of the lower bit of the two-bit group formed from the multiplier, whereas the input signal IN2 is of the upper bit. The input for signal IN0 into the booth decoder 1 is connected with the input port for signal IN2 of the lower booth decoder. In such a booth decoder 1, the input signals IN1, IN2 and IN0 are weighted with +1, +1 and −2, respectively, and each of the sums is provided as interim output signal BO0, BO1 or BO2. The output signals BO2 and BO1 indicate the upper bit and the lower bit of the absolute value of the sum (2 bits), respectively. The output signal BO0 is 0 when the sum is equal to 0 or positive, and is 1 when it is negative.

Figure 4:
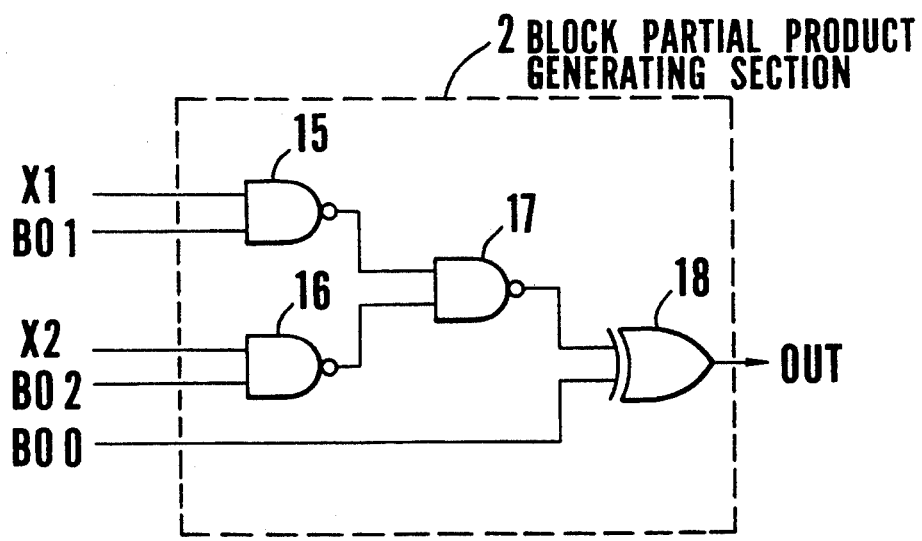
FIG. 4 is a detailed circuit of a block partial product generating section in a partial product generating circuit shown FIG. 2.

FIG. 4 is a detailed circuit of a block partial product generating section in a partial product generating circuit shown in FIG. 2.

As shown in FIG. 4, a block partial product generating section 2 includes three NAND gates 15 to 17 and an exclusive OR gate 18 and forms partial products from the output signals BO0 to BO2 of the above booth decoder 1 and the multiplicand X. More specifically, the block partial product generating section 2 comprises a fourth NAND gate 15 which is provided with a first input signal X1 of the multiplicand X and the second interim output signal BO1; a fifth NAND gate 16 which is provided with a second input signal X2 of the multiplicand X and the third interim output BO2; a sixth NAND gate 17 which is connected on the input side thereof separately with the output ports of the fourth and fifth NAND gates 15 and 16; an exclusive OR gate 18 which is provided with the output signal of the sixth NAND gate 17 and the first interim output signal BO0. In this arrangement, assuming that the multiplicand X is composed of m bits, the partial product to be obtained will be of (m+1) bits. This can be dealt with by providing (m+1) sets of the block partial product generating sections 2 in parallel. In this case, the bit X2 in the lowest section 2 of the (m+1) block partial product generating sections 2 is inputted with "0". The X1 in the i-th (2≦i≦m) block partial generating section 2 from the lowest one is provided with the i-th bit (from the least) of the multiplicand X while the X2 in the same section is provided with (i−1)th bit of the same X. The X1 and X2 in the highest block partial product generating section 2 are both provided with the m-th bit of the same multiplicand. On the other hand, the input ports for BO0, BO1 and BO2 signals are provided with the respective output signals BO0, BO1 and BO2 from the corresponding booth decoder 1, and thus the OUT port sends out a partial product of (m+1) bits. The input signals BO0 to BO2 each take a value of any integer between −2 and +2, and the block partial product generating section 2 outputs the multiplication of the multiplicand X by the above value. Here, if BO0 is equal to 1, the partial product is expressed as the complementary representation of 1, and otherwise, the partial product is expressed as the complementary representation of 2.

As has been explained heretofore, the multiplying circuit of the present invention is constructed such that the number of the gate steps from the booth decoder to the output port for BO0 becomes the least and so that even if the signal BO0 to the input port for BO0 of the partial product generating circuit reaches later than the other input signals, the delay would not exert influence on the speed of the total operation. This feature makes it possible to form the partial products at an increased speed, so that the circuit can affectively inhibit the maximum delay time from becoming large. Specifically, if the number of the input bits increases one and a half times, one more full adder array is to be added. As a result, with a large n, the delay time will increase in proportion to the logarithm of n. This fact becomes advantageous, as compared to the conventional array type multiplier, to the operation speed when n becomes large.

Further, in the multiplying circuit in accordance with the present invention, since the partial product generating circuits can be formed by the repetitions of a simple circuit, it is possible to simplify the design and inhibit the chip from being large-sized. Specifically, when the partial product generating circuit of the present invention is combined with the booth decoder,. a multiplicand of m bits is formed into partial products of $(m+1)$ bits. This can be dealt with by arranging $(m+1)$ sets of the block partial product generating section in parallel. In this case, the input signal X2 in the lowest section in the partial product generating circuit may be substituted with "0", whereas both the input signals X1 and X2 of the highest section of the partial product generating circuit may be provided both with the highest bit of the multiplicand X.

What is claimed is:

1. A multiplying circuit comprising:
   a plurality of booth decoders each receiving a group of bits into which a multiplier is divided, and outputting corresponding interim result;
   a plurality of partial product generating circuits each connected at the input side thereof to respective said booth decoders, and receiving a multiplicand of plural bits to generate a partial product of the multiplicand with said interim result;
   a first full adder array for forming first interim sums by adding up said partial products from said plural partial product generating circuits;
   a second full adder array for forming second interim sums by adding up the first interim sums and a value which is formed by arranging each of the lowest bits of the plural interim results spaced apart by an interval of plural bits; and
   an adder for adding up said second interim sums provided by said second full adder array to generate a multiplication output.

2. A multiplying circuit according to claim 1, wherein said booth decoder comprises:
   a series of first and second inverters disposed between a first input port for a multiplier and a first output port of the booth decoder;
   an exclusive OR gate connected at the input side thereof separately with second and third input ports for the multiplier;
   a third inverter connected between the output port of said exclusive OR gate and a second output port of the booth decoder;
   fourth and fifth inverters respectively connected at the input side thereof to said second and third input ports;
   a first NAND gate connected at the input side thereof separately with the output port of said first inverter, and said second and third input ports;
   a second NAND gate connected at the input side thereof separately with said first input port and the output ports of said fourth and fifth inverters; and
   a third NAND gate connected at the input side thereof separately with the output ports of said first and second NAND gates.

3. A multiplying circuit according to claim 1, wherein said partial product generating circuit comprises a plurality of block partial product generating sections each connected to a corresponding said booth decoder, and receiving a signal set of plural bits formed from the multiplicand to produce a respective partial product; and the number of said plural block partial product generating sections is the number of the bits of the multiplicand plus one.

4. A multiplying circuit according to claim 3, wherein said block partial product generating sections comprises:
   a fourth NAND gate connected at the input side thereof separately with a first input of the multiplicand and an input port for receiving a second signal of said interim result;
   a fifth NAND gate connected at the input side thereof separately with a second input of the multiplicand and an input port for receiving a third signal of said interim result;
   a sixth NAND gate connected at the input side thereof separately with the output ports of said fourth and firth NAND gates; and
   an exclusive OR gate, connected at the input side thereof separately with the output port of said sixth NAND gate and an input port of the section for receiving a first signal of said interim result, and generating an output signal.

* * * * *